(No Model.)
A. S. BENNER.
Milk Cooler.
No. 236,481.  Patented Jan. 11, 1881.
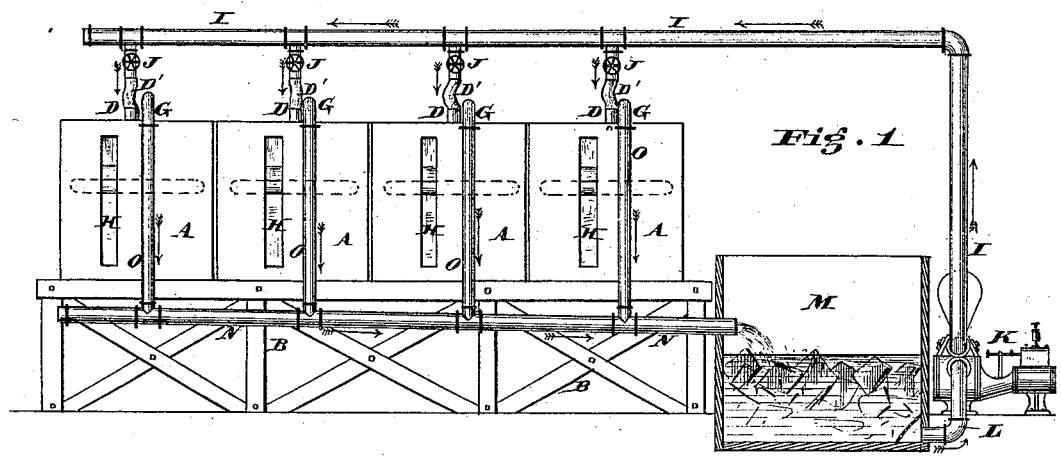
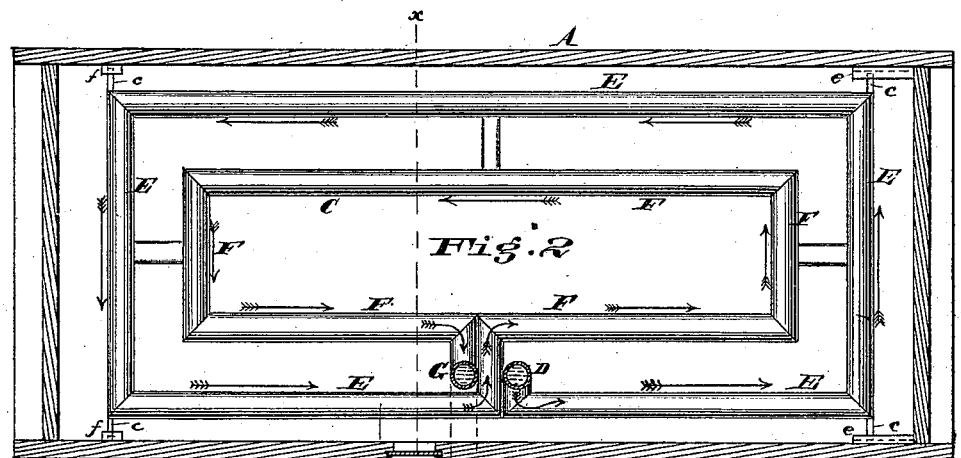
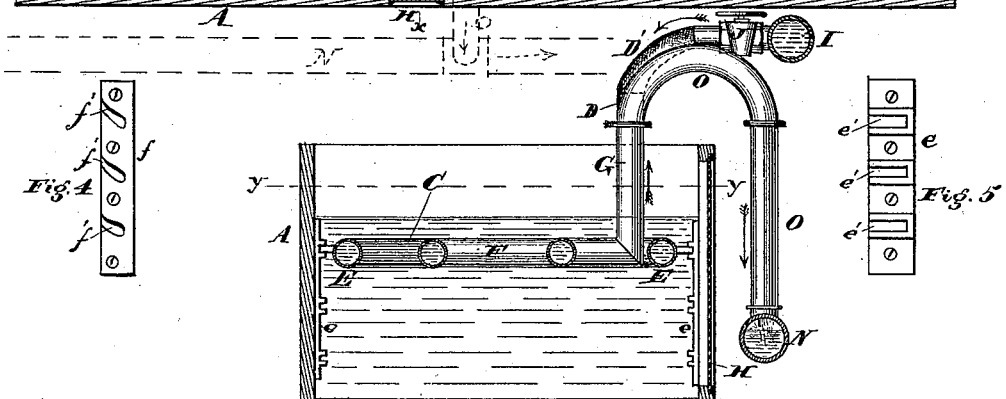
Attests
Wesley Williams
L. J. Matos
Inventor
Abraham S. Benner
By his atty

UNITED STATES PATENT OFFICE.

ABRAHAM S. BENNER, OF PERKASIE, PENNSYLVANIA.

MILK-COOLER.

SPECIFICATION forming part of Letters Patent No. 236,481, dated January 11, 1881.

Application filed September 11, 1880. (No model.)

*To all whom it may concern:*

Be it known that I, ABRAHAM S. BENNER, of Perkasie, in the county of Bucks and State of Pennsylvania, have invented an Improvement in Milk-Coolers, of which the following is a specification.

My invention relates to milk-cooling vats designed to raise the cream for the purpose of obtaining it for the manufacture of cheese, butter, &c.; and my invention consists in the method of cooling the milk by passing cold or ice water through a series of cooling pipes or coils, carrying the water first through the outer or exterior coils or pipes, and then through the inner coils or pipes, for the purpose hereinafter set forth; further, in the construction and arrangement of a series of cooling-vats side by side and apparatus to operate them in accordance with my invention, as set forth in the following specification; and, further, in detailed construction, all of which is fully described in the following specification, shown in the accompanying drawings, and referred to in the appended claims.

The object of my invention is to cause a more perfect and uniform separation of the cream from the milk in less time and with less expense.

In the drawings, Figure 1 is an elevation of a series of vats and apparatus to operate according to my invention. Fig. 2 is a sectional plan of one of my improved vats on the line $yy$ of Fig. 3. Fig. 3 is a cross-section of same on line $xx$ of Fig. 2. Figs. 4 and 5 are elevations of supports for the coils or cooling-pipes.

A are the vats, and they are made of wood, preferably, with a metallic lining. There may be one or a number of them arranged about three or four feet from the floor upon supports B. One side of these vats is provided with a narrow plate of glass, H, arranged vertically in an opening in said side, for the purpose of inspecting the progress of the cream-raising. Situated within these vats are the coils C, as shown in Figs. 2 and 3. There is a single stationary coil, C, in each vat.

Heretofore the cooling-pipes have been made like S or ⌇, and the great objection to those constructions lies in the fact that the cold water which enters them cools the milk at one side only, then passes to the middle, and when in its warmest condition passes to the other side; whereas by my construction of outer and inner coils I cause the water in its coldest condition to pass first through the outer coil and then through the inner coil, as shown by arrows in Fig. 2, thereby cooling the milk next to the sides of the vat (and only separated from the warm atmosphere by the wooden sides) the most, since it is the warmest and more liable to absorb heat; and after performing the work of reducing the temperature of the milk near the sides it then cools the milk at and near the middle and where its temperature is more easily lowered. By this method of cooling it is evident that the temperature of the milk remains uniform and lowers evenly throughout the entire body. These coils C are made up of the outer coil, E, and the inner coil, F, joined together by ties or equivalent braces, as shown in Fig. 2. The inlet D is a vertical tube, and is in communication with the outer coil, E, and the vertical outlet G is similar to the inlet, and is in communication with the inner coil, F. The coils C are provided with laterally-projecting pieces $c$, secured to either corner. To one end of the vat, and secured to either side, are the brackets or supports $e$, which are provided with three or more slots, $e'$, in them, and secured to the opposite end of the vat are the supports $f$, provided with three or more curved slots, $f'$.

To set the coils in position the pieces $c$ on one end are placed in slots $e'$, of the same level on both sides, and then the pieces $c$ on the other end of the coils are slid into corresponding curved slots $f'$. By pulling up bodily the coils C cannot be removed, but must be slid out endwise. The three series of slots $e'$ and $f'$ allow the coils to be set at various levels, according to the quantity of milk to be cooled in the vats, the coils always being set near the top.

Heretofore the cooling-pipes have been hung from shafts at the top of the vats, and through the agency of ropes and gearing have been raised and lowered; but as a manufacturer usually raises the cream from the same quantity of milk daily, the usual raising and lowering gear, shafts, ropes, &c., are a nuisance, liable to get out of order, and expensive to construct. The same object is obtained by my simple and cheap construction, and the coils are at the same time rigidly supported.

The inlets D are connected to the cold-water main I, arranged above the vats A, by flexible tubes D', and the supply of water to each coil may be regulated or shut off altogether by valves J. The flexible tubes D' allow the coils C to be set high or low in the vats without displacing the main I. This water-main receives its supply from a force-pump, K, of any description, the section-pipe L of which is in communication with the bottom of the ice-water tank M, in which plenty of ice is placed.

The efflux or outlets G are connected to siphons O, which are connected at their lower ends with the waste-main N, which delivers its supply of luke-warm water into the ice-tank M at the top, where it is cooled, and again pumped through the coils C.

To allow the coils to be set at different levels in the vat without displacement of the waste main, the curved part of the siphon may be flexible or the lower part of it may be telescoped. By this construction any number of vats can be cut off from operation. For instance, if the quantity of milk to be operated on is only sufficient to fill two vats the remainder of the vats will be shut off.

Heretofore the water was run through the cooling-pipes in the first vat, and from that through the second, and so on through them all, from which it is evident that the water which reaches the cooling-pipes in the last vat has little or no cooling power, and of a necessity the milk in each vat will not only be irregular in temperature, but the milk of each will have a different local temperature, the cream being raised in the first one long before the last, consequently the number of vats formerly used as a battery was limited; whereas with my improvement any number of vats can be used, and the local as well as the general temperature in each and all will always be the same.

The waste-main N being situated at a lower level than the coils C, once the water is forced over the siphon O it begins to run with a pressure, independent of the pump, equal to the weight of a column of water having a height equal to the differences in the levels of the coils C and the main N; hence there is a continual suction of water through the coils, and the only work the pump has to perform is to raise the water from the bottom of the cold-water tank M to the cold-water main I.

Heretofore no siphonage was used, and the pump had to force the water up to the top of the vats and then through the series of cooling-pipes of the various vats, which are all in communication. By my construction I save power, which immediately points to a saving in fuel, and also wear and tear on the pump; and further, the pump need not be of the same horse-power, having less work to perform.

Having now described my invention, what I claim as new, and desire to secure by Letters Patent, is—

1. The herein-described method of cooling milk in vats for the purpose of raising the cream, consisting in causing cold water to circulate first through an outer coil of pipe, and then through an inner coil of pipe, cooling the milk the greatest at the sides and with the coldest water, and then at and near the middle by the warmest water, substantially as and for the purpose specified.

2. The herein-described apparatus for raising cream from milk, consisting of the following parts in combination, to wit: one or more vats, A, provided with coils C, composed of the outer coil, E, and inner coil, F, inlet D, and outlet G, water-main I, pump K, suction-pipe L, cold-water tank M, waste-water main N, and siphon O, all constructed and operating substantially as and for the purpose specified.

3. In apparatus for raising cream from milk, the cooling-coils C, consisting of the outer coil, E, provided with an inlet, D, for the cold water, and the inner coil, F, provided with the outlet G, for discharging the warmed water, substantially as shown, and for the purpose specified.

4. In apparatus for raising cream from milk, a double coil, C, one encircling or inclosing the other, in combination with an inlet-pipe, D, secured to the outer coil, E, and a siphon, O, and discharge-pipe G, secured to the inner coil, F, the whole working to cause the coldest water to pass first through the outer coil and cool the milk next to the sides of the vat, and then pass through the inner coil and cool the milk at and near the middle of the vat, all constructed substantially as shown and described.

In testimony of which invention I hereunto set my hand.

ABRAHAM S. BENNER.

Witnesses:
LISLE STOKES,
L. J. MATOS.